(12) United States Patent
Stickel et al.

(10) Patent No.: US 8,626,405 B2
(45) Date of Patent: Jan. 7, 2014

(54) MONITORING DEVICE FOR AN INTERNAL COMBUSTION ENGINE

(75) Inventors: Claus-Peter Stickel, Warendorf (DE); Ludger Hugenroth, Ostbevernr (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 175 days.

(21) Appl. No.: 13/175,995

(22) Filed: Jul. 5, 2011

(65) Prior Publication Data

US 2012/0010786 A1    Jan. 12, 2012

(30) Foreign Application Priority Data

Jul. 8, 2010 (DE) .......................... 10 2010 026 600

(51) Int. Cl.
*F01N 3/025* (2006.01)
*B01D 53/94* (2006.01)

(52) U.S. Cl.
USPC .................. 701/50; 60/274; 60/295; 422/172

(58) Field of Classification Search
CPC .......... F01N 2610/02; F01N 2900/102; F01N 9/002; F01N 2900/1814; F02D 41/029
USPC .............................. 60/274, 276, 295; 422/172
See application file for complete search history.

(56) References Cited

U.S. PATENT DOCUMENTS

| | | | | |
|---|---|---|---|---|
| 6,758,039 | B2 * | 7/2004 | Kuboshima et al. ............ | 60/311 |
| 8,412,451 | B2 * | 4/2013 | Johnson ........................ | 701/400 |
| 2005/0268597 | A1 * | 12/2005 | Kosaka .......................... | 60/277 |
| 2005/0279069 | A1 * | 12/2005 | Novembri et al. ............. | 56/13.1 |
| 2006/0191256 | A1 * | 8/2006 | Colignon ....................... | 60/295 |
| 2009/0013758 | A1 * | 1/2009 | Baumann et al. ............ | 73/23.33 |
| 2010/0154389 | A1 * | 6/2010 | Schumacher et al. .......... | 60/286 |
| 2010/0219945 | A1 * | 9/2010 | Schumann et al. ........... | 340/438 |
| 2011/0011066 | A1 * | 1/2011 | Back et al. ...................... | 60/295 |
| 2011/0213542 | A1 * | 9/2011 | Chazal .......................... | 701/102 |
| 2011/0225949 | A1 * | 9/2011 | Tewari et al. .................. | 60/274 |
| 2011/0307160 | A1 * | 12/2011 | Verdegan et al. ............. | 701/102 |
| 2012/0012745 | A1 * | 1/2012 | Schroeder .................... | 250/288 |

FOREIGN PATENT DOCUMENTS

EP           1900918 A1 *   3/2008 ............. F02D 41/02

* cited by examiner

*Primary Examiner* — Khoi Tran
*Assistant Examiner* — Ryan Rink
(74) *Attorney, Agent, or Firm* — Michael J. Striker

(57) ABSTRACT

A monitoring device for at least one auxiliary assembly which influences the exhaust-gas quality of an internal combustion engine and consumes a resource in order to attain a desired quality of exhaust gas, includes at least one sensor for measuring a variable related to the resource, and an arithmetic unit for estimating the current quantity of the resource on the basis of the variable measured by the at least one sensor, and which is designed to calculate and indicate an operating capacity of the internal combustion engine that remains before the resource is depleted. Potential resources are the absorbance capacity of a particulate filter and/or the quantity of an ammonifier that is available.

16 Claims, 1 Drawing Sheet

MONITORING DEVICE FOR AN INTERNAL COMBUSTION ENGINE

CROSS-REFERENCE TO RELATED APPLICATION

The invention described and claimed hereinbelow is also described in German Patent Application DE 10 2010 026 600.0 filed on Jul. 8, 2010. This German Patent Application, whose subject matter is incorporated here by reference, provides the basis for a claim of priority of invention under 35 U.S.C. 119(a)-(d).

BACKGROUND OF THE INVENTION

Tighter legal regulations on the content of pollutants in engine exhaust gasses have prompted engine builders to intensify their developmental efforts. Two developmental approaches are of particular interest, namely one of collecting the pollutants in a filter, and another of continuously breaking down the pollutants in a catalytic converter.

In accordance with the first approach, particulate filters have been installed on a regular basis for some time in passenger vehicles equipped with diesel engines in order to capture soot particles emitted by the diesel engine. Soot particles settle into capillaries of the filter, thereby causing the pressure drop at the filter to increase during operation; in the extreme case, the filter can become clogged. To prevent such clogging, the filter must be regenerated from time to time by burning off the soot particles deposited therein.

The filter must be heated to a great extent in order to burn off the soot. Basically, this can be accomplished by operating the engine under high load or via a suitable manipulation of the point in time when fuel is injected into the engine. For example, extremely retarded injection or injecting fuel into a cylinder of the engine after it has passed top dead center and the previously injected fuel has already been ignited are ways to generate exhaust gas that is very hot and/or contains unburned fuel and heats the filter directly or via catalytic combustion that occurs downstream of the engine.

Once the soot deposited in the filter starts to burn, the combustion thereof provides a more or less considerable portion of the heat required to sustain combustion. It is therefore important to regulate the supply of energy to the filter from the outside during filter regeneration to ensure that the temperature in the filter does not reach a point at which the filter material begins to melt or sinter. The smaller the dimensions of a particulate filter are, the more rapidly heat from the filter dissipates into the surroundings. Heat loss is therefore relatively low in the case of a large-size filter of the type used, for instance, on a high performance engine of an agricultural machine such as a tractor, a combine harvester, a forage harvester, or the like. Although regeneration can therefore be initiated using a relatively small quantity of fuel, there is a great risk that the heat released by the combustion of the stored soot will cause the filter to overheat and become damaged.

To reliably prevent such damage from occurring, the conditions under which regeneration takes place must be strictly controlled, and disturbing influences that can cause the filter temperature to deviate upward or downward, in the manner of load fluctuations of the engine, must be avoided. To enable such strict control to be performed, it is common to require that filter regeneration be carried out only when the engine is idling.

Due to this limitation, the engine or a machine driven by the engine cannot be used while regeneration is underway[1].

Regeneration that takes place at an inopportune time is bothersome to the machine operator since work must be interrupted. If a plurality of machines works together to perform a task, such as harvesting and hauling machines used to harvest a field, an interruption in the operation of one machine affects the other machines and can result in enormous economic losses.

In pursuing the second approach mentioned above, a proposal was made to reduce the quantity of pollutants, nitrogen oxides in particular, that are produced in combustion by injecting an ammonifier into the exhaust-system branch, which reacts with the nitrogen oxides contained in the exhaust gas. Since this technique is much more difficult to implement than filtering, it has not found widespread use in the mass market. However, assumptions are that it will become absolutely essential for large engines in order to meet the increasingly stricter standards for exhaust gas. Unfortunately the ammonifiers known today, which are in the form of aqueous urea solutions, do not remain stable over the long term. An operator is therefore unable to stockpile them in order to replenish the urea supply to an engine at any time as needed. Additionally, there is no sales infrastructure in place that would allow last-minute demands to be satisfied around the clock, seven days a week, as is the case for engine fuels. If the ammonifier suddenly runs out, it may therefore become necessary to interrupt operation of the engine at an inopportune time, which is precisely what happens when a filter becomes full.

SUMMARY OF THE INVENTION

The problem addressed by the present invention is that of creating a monitoring device for an internal combustion engine and an agricultural working machine comprising an internal combustion engine, which make it possible to avoid sudden interruptions of operation.

The problem is solved by a monitoring device for at least one auxiliary assembly which influences the exhaust-gas quality of the internal combustion engine and consumes a resource in order to attain a desired quality of exhaust gas, comprising at least one sensor for measuring a variable related to the resource, and an arithmetic unit for estimating the current quantity of the resource on the basis of the variable measured by the at least one sensor, and for calculating the operating capacity of the internal combustion engine that remains before the filter capacity becomes full. On the basis of the remaining capacity that is indicated, an operator can estimate when to expect operation to be interrupted if the resource is not replenished in time, and to take this into account in workflow planning.

In the simplest case, the remaining operating capacity can be expressed as a quantity of the resource that is still available, or as a ratio of said quantity to the maximum quantity of the resource that is present immediately after it is replenished. However, it is more useful to an operator for the monitoring device to be set up to indicate the remaining operating capacity as an operating time of the diesel engine that remains until the resource is depleted. An operator can therefore easily determine whether the resource must be replenished during a period of time in which he intends to use the engine, or not.

If the engine drives a vehicle such as a tractor, a combine harvester, or the like, it may also be expedient for the remaining operating capacity of the filter to be indicated as a driving distance that remains before the resource is depleted. This also makes it easy for an operator to determine whether the remaining operating capacity is sufficient for completing a stated task or not.

If the vehicle is a harvesting vehicle such as a combine harvester, a forage harvester, or the like, it may also be expedient for the remaining operating capacity to be indicated as a remaining quantity of crop, or even as an amount of territory to be worked before replenishment is required. This also makes it easy for an operator to decide whether a given territory can be harvested before regeneration is required, or e.g. whether there is sufficient capacity remaining to fill a grain tank on the vehicle, and to wait until the vehicle idles in order to unload the full tank before replenishing.

Advantageously, an operator can be provided with the option—via a user interface of the monitoring device—to select the unit of measurement in which the remaining operating capacity should be indicated, in accordance with his particular needs at the time.

To improve an operator's comfort, the monitoring device can comprise an interface which can be used to enter a work plan into the monitoring device, the work plan specifying, at the least, times for the use or non-use of the engine; the monitoring device is designed to not only estimate an operating capacity that currently remains, but also to forecast the remaining operating capacity at future points in time, after and/or during implementation of the work plan, and, in particular, to estimate the point in the work plan at which the resource will likely become depleted. This makes it possible to quickly evaluate whether the work plan that has been entered can be completed using the available quantity of the resource, and/or at which point in time the resource should be replenished.

The monitoring device can automatically account for the requirements of a work plan that has been entered, i.e. if the forecast calls for the resource to become depleted in a period of use specified in the work plan, the monitoring device initiates a replenishment of the resource in a preceding period of non-use, or possibly performs the replenishment itself.

If the auxiliary assembly is a particulate filter, in particular an exhaust gas filter of the internal combustion engine, then, expediently, the resource is the storage capacity of the particulate filter. In terms of computation, it is expedient to initially calculate the remaining operating capacity as a quantity of particulates that the filter can absorb until the storage capacity thereof becomes full, and to convert said remaining capacity into the remaining capacity indicated in other units, as described above, by reference to the inflow of particulates estimated in the past.

Since it is difficult to measure the absorbance capacity of a filter that remains at a given point in time, the arithmetic unit is expediently designed to estimate the inflow of particulates by reference to the variable measured by the at least one sensor, and to calculate the remaining operating capacity by integration of the particulate inflow.

Provided the monitoring device is thusly designed, it may also initiate premature filter regeneration as necessary if a favorable period of time therefor is available.

Expediently, such a monitoring device is also designed to control a regeneration of the particulate filter as required, i.e. when the capacity thereof to store particulates has become full. The criterium for depletion can be that the geometric carrying capacity of the filter is full, the pressure drop of the exhaust gas flowing therethrough exceeds a limit value, or the quantity of stored particulates is so great that the risk of overheating occurring during burn-off can no longer be reliably ruled out.

According to a second embodiment of the invention, the auxiliary assembly can be a metering device for an ammonifier, and the resource is a supply of ammonifier.

In this case, the at least one sensor is preferably a fill level sensor on a supply container of the ammonifier.

The monitoring device can also be designed to monitor a plurality of auxiliary assemblies simultaneously, such as a particulate filter and a metering device for ammonifiers. In that case, expediently, the remaining operating capacity that is indicated is the least of a plurality of remaining operating capacities calculated by reference to various resources.

A further subject matter of the invention is an agricultural machine comprising a diesel engine, a particulate filter, and a monitoring device for the particulate filter as described above.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
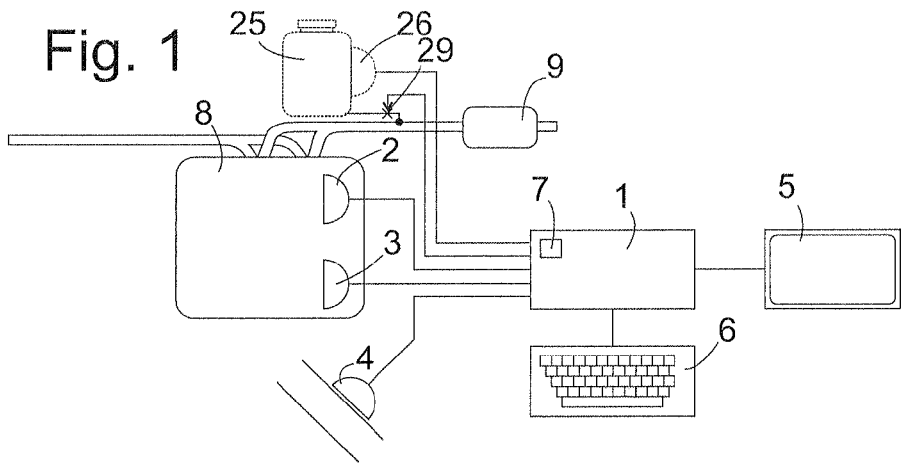
FIG. 1 shows a block diagram of a monitoring device according to the invention.

The monitoring device according to the invention is implemented in the form of a microprocessor system 1 which is connected to diverse sensors 2 to 4 of an agricultural vehicle such as a combine harvester, a forage harvester, or the like, comprising a display screen 5 and an input device 6. Input device 6 is depicted here schematically as a computer keyboard; however, it can also be a remote data transmission interface for receiving work plan data from a remote computer, or it can be a reading device for data storage devices, an insertion point for a USB stick, or the like.

An operating program of microprocessor system 1 comprises a module 7 for calculating the particulate emissions of a diesel engine 8 of the harvesting vehicle, expressed as mass per unit of time, depending on engine operating parameters measured using sensors 2, 3 disposed on engine 8, such as engine speed, metering of fuel, point of injection, air throughput, power, or the like. Since the particulate generation rate delivered by module 7 is integrated over the period of time that has passed since the last filter regeneration, the remaining quantity of particulates that filter 9 can store before regeneration is required can be indicated at any time by reference to the quantity of particulates captured in a filter 9 disposed in the exhaust-system branch of engine 8, or based on the knowledge of the maximum particulate absorbance capacity of filter 9.

According to a simple embodiment, microprocessor system 1 is designed to convert said remaining particulate quantity—by dividing by a mean of the particulate generation rates calculated by the module in the past on the basis of values measured by sensors 2, 3, which were current at the time—into a remaining operating time of engine 8 until filter 9 is full and must be regenerated, and to display said remaining time on display screen 5.

Figure 2:
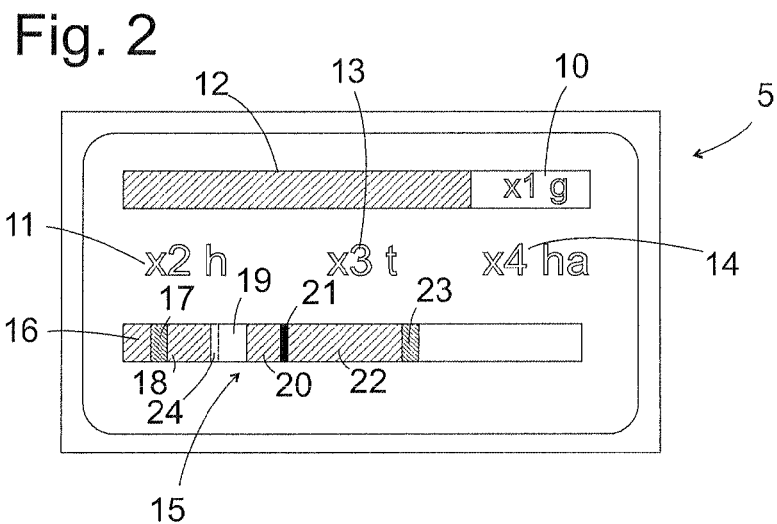
FIG. 2 shows a display image, as an example, on a display screen of the monitoring device.

As shown in FIG. 2, the remaining particulate quantity in grams can be displayed as a numeral 10, and the run time remaining in hours can be displayed as a numeral 11 on display screen 5, for example. In addition, the ratio of remaining particulate quantity or particulate quantity already absorbed, to the holding capacity of the filter can be displayed graphically, as a bar diagram 12.

According to an expedient development, the sensors include at least one sensor, e.g. sensor 4, that does not measure an operating variable of engine 8 related to particulate generation, but rather the crop flow expressed in tons/hour, for instance. By reference to a mean of values of crop flow measured by sensor 4 in the past, microprocessor system 1 converts the remaining run time to a remaining crop quantity that can be harvested before the holding capacity of the filter becomes full, and displays same as a numeral 13.

Adjacent to numeral 13, the remaining holding capacity of a grain tank on the vehicle can also be indicated on display screen 5. An operator can therefore quickly determine whether the remaining filter capacity is sufficient for filling the grain tank and subsequently perform filter generation when the harvesting vehicle idles to be unloaded. Alternatively, microprocessor system 1 itself can also perform such a comparison and inform the driver of the result, e.g. via the color of numeral 13.

By reference to numeral 13, a driver is immediately able to determine whether it is possible to finish harvesting a field that has been started, before regeneration is required. To simplify said determination, a development provides that microprocessor system 1 also collects data on vehicle speed in order to calculate—on the basis thereof and on the basis of the known width of a front harvesting attachment of the vehicle—the amount of territory remaining to be harvested before the filter capacity is full, and to display same as information 14.

An agricultural vehicle must also perform tasks in which no crop flow occurs, such as plowing, hay mowing, etc. In those cases as well it may be expedient to convert a remaining operating time, which has been estimated as described above, into territory remaining to be worked by reference to previously collected data on vehicle speed and the known width of the particular working tool that is used.

Input device 6 is used to enter a work plan for the vehicle into microprocessor system 1. In the simplest case, such a work plan specifies working times and non-working times of the vehicle; in a further-developed embodiment, a distinction can be made between working time that the vehicle spends in road traffic, and working time on the field. Any other breakdown of the work plan by times that have different values for the particulate generation rate is feasible.

The work plan data can be entered manually, via remote data transmission from an external computer, using a data storage device, or in any other manner. The work plan is depicted on display screen 5 as a bar diagram 15 in which the horizontal direction is the time axis, and in which differently colored sections stand for working times of the machine, resting times, and the like. For example, bar diagram 15 depicted in FIG. 2 shows the working program for the current day, which is still being implemented, wherein the left edge of diagram 13 is the current point in time.

Sections 16, 17, 18 on the left side of diagram 15 represent harvesting to be performed in the morning, an adjacent white section 19 represents a lunch break, and sections 20 to 23 represent the work to be performed in the afternoon. On the basis of previously recorded, typical harvesting-related values measured by sensors 2, 3, module 7 of microprocessor system 1 forecasts the particulate generation and is therefore capable of predicting that filter generation—which is depicted as black section 21—will have to be performed sometime that afternoon. Said regeneration would disrupt the afternoon workflow.

Microprocessor system 1 recognizes the overlap of the regeneration with the planned harvesting work, checks to determine whether the particulate quantity stored in filter 9 is sufficient for performing a stable burn-off before the end of morning use 16-18, and, if so, proposes to the driver that regeneration be performed during the lunch break instead, by marking a subsection 24 within section 19 of diagram 15 representing the lunch break. Advantageously, said subsection 24 is proposed immediately after last section 18 of the morning work, in order to utilize the warmth remaining in filter 9 after said use for the regeneration. If the driver accepts the proposal by making an appropriate entry on device 6, microprocessor system 1 automatically controls the regeneration at the proposed time.

Lightly shaded sections 16, 18, 20, 22 of bar diagram 15 each stand for planned times for field work; more darkly shaded sections 17, 23 stand for planned driving of the vehicle in road traffic to move the vehicle from one field to be worked to the next one, or to return home. For road travel, the operating parameters of the engine measured by sensors 2, 3 can differ clearly from those used for field work, and can result in a contradictory particulate generation rate. Different rates of that type are taken into account in the forecast of particulate quantity in filter 9.

In a second embodiment of the invention, arithmetic unit 1 is connected to a fill level sensor 26 disposed on a tank 25 for a urea solution. The urea solution is intended for injection with the fuel into the exhaust-system branch to release ammonia there, which reduces nitrogen oxides formed during combustion of the fuel in the engine. In the following, only one embodiment is described, in which arithmetic unit 1 monitors the fill level of urea tank 25 and, via a metering valve 29, the metering of the urea into the exhaust gas, and filter 9; a simplified embodiment, in which arithmetic unit 1 only monitors urea tank 25 and the metering, would be obvious to a person skilled in the art on the basis of the description that follows.

Figure 3:
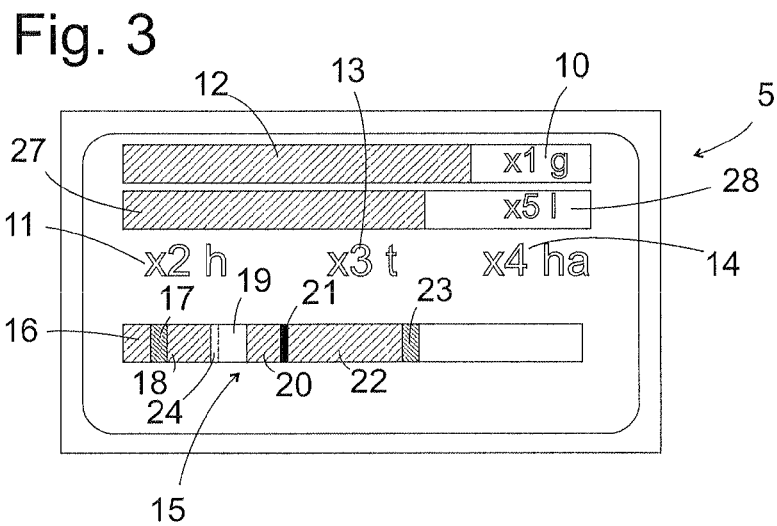
FIG. 3 shows a display image on a display screen of a further-developed embodiment of the monitoring device.

FIG. 3 shows, in analogy to FIG. 2, a typical image output by arithmetic unit 1 on display screen. Bar diagram 12, which is based on the monitoring of filter 9, is the same as shown in FIG. 2, and will not be explained once more. A further bar diagram 27 indicates the fill level of urea tank 25, and the quantity of urea solution remaining in tank 25, which is determined by sensor 26, is displayed qualitatively as a numeral 28.

On the basis of consumption values of urea solution measured in the past, arithmetic unit 1 forecasts the amount of time that engine 8 can continue to run until the urea supply in tank 25 has been depleted. This time is compared to the time remaining until the next filter regeneration, which was calculated as described with reference to the first embodiment, and the lesser of the two times is displayed as a numeral 11 for the remaining operating time. On the basis of said remaining operating time, the remaining harvesting quantity and the remaining territory of numerals 13, 14 are calculated.

It can be provided that a text message or a special icon is displayed on display screen 5, to signal to the driver whether the factor limiting the remaining operating capacity is the filter capacity or the urea supply. It is also feasible, however, to display sections that indicate the need to replenish a resource in the work plan of bar diagram 15, such as section 21 which indicates filter regeneration, in different colors depending on which resource needs to be replenished.

It will be understood that each of the elements described above, or two or more together, may also find a useful application in other types of constructions differing from the types described above.

While the invention has been illustrated and described as embodied in a monitoring device for an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A monitoring device for at least one auxiliary assembly, wherein the auxiliary assembly affects an exhaust-gas quality of an internal combustion engine and consumes a resource in order to attain a desired quality of exhaust gas, the monitoring device comprising
    at least one sensor measuring a variable related to the resource,
    a crop flow sensor for sensing a crop flow in an agricultural vehicle in which the mounting device may be installed, and
    an arithmetic unit for estimating a current quantity of the resource on a basis of the variable measured by the at least one sensor,
    wherein the arithmetic unit furthermore calculates and indicates an operating capacity of the internal combustion engine that remains before the resource is depleted and, based on sensed crop flow and reference to a mean of past measured crop flows, converts a remaining run time to a remaining crop quantity that may be harvested before the resource consumed by the auxiliary unit is depleted.

2. The monitoring device according to claim 1, wherein the monitoring device indicates a parameter selected from the group consisting of the remaining operating capacity as an operating time of the internal combustion engine that remains until the resource is depleted, a remaining driving distance, if the internal combustion engine drives a vehicle, and a remaining crop quantity or a remaining territory to be worked, if the vehicle is an agricultural working vehicle.

3. The monitoring device according to claim 2, further comprising an interface for an input of a work plan.

4. The monitoring device according to claim 3, wherein the monitoring device initiates a replenishment of the resource in a preceding period of non-use if a forecast calls for the resource to become depleted in a period of use.

5. The monitoring device according to claim 1, wherein the auxiliary assembly is a particulate filter of the internal combustion engine, and the resource is the storage capacity of the particulate filter.

6. The monitoring device according to claim 5, wherein the arithmetic unit estimates, on a basis of the variable measured by the at least one sensor, a particulate inflow to the filter, and calculates the remaining operating capacity by integration of the particulate inflow.

7. The monitoring device according to claim 6, wherein the monitoring device calculates a particulate quantity that the filter can absorb until a storage capacity thereof is full, and converts said particulate quantity into an indicated remaining capacity on a basis of the estimated particulate inflow.

8. The monitoring device according to claim 5, wherein the monitoring device controls a regeneration of the particulate filter when the remaining operating capacity is zero.

9. The monitoring device according to claim 1, wherein the auxiliary assembly is a metering device for an ammonifier, and the resource is a supply of the ammonifier.

10. The monitoring device according to claim 9, wherein the at least one sensor is a fill level sensor on a supply container of the ammonifier.

11. The monitoring device according to claim 1, wherein the arithmetic unit estimates current quantities of at least two resources, estimates remaining operating capacities corresponding to the estimated current quantities, and displays a smallest estimated remaining operating capacity.

12. A monitoring device according to claim 5, wherein the particulate filter is an exhaust gas filter.

13. An agricultural machine including a monitoring device for at least one auxiliary assembly wherein the auxiliary assembly affects an exhaust-gas quality of an internal combustion engine and consumes a resource in order to attain a desired quality of exhaust gas, the monitoring device comprising:
    at least one sensor measuring a variable related to the resource,
    a crop flow sensor for sensing flow in the agricultural machine in which the mounting device may be installed, and
    an arithmetic unit for estimating a current quantity of the resource on a basis of the variable measured by the at least one sensor,
    wherein the arithmetic unit furthermore calculates and indicates an operating capacity of the internal combustion engine that remains before the resource is depleted and, based on sensed crop flow and reference to a mean of past measured crop flows a remaining run time to a remaining crop quantity that may be harvested before the resource consumed by the auxiliary unit is depleted,
    wherein the auxiliary assembly is a particulate filter of the internal combustion engine, and the resource is the storage capacity of the particulate filter, and
    wherein the agricultural machine is a harvesting machine.

14. An agricultural machine, comprising an internal combustion engine, at least one auxiliary assembly and the monitoring device,
    wherein the auxiliary assembly affects an exhaust-gas quality of the internal combustion engine and consumes a resource in order to attain a desired quality of exhaust gas, and
    wherein the monitoring device comprises:
        at least one sensor measuring a variable related to the resource,
        a crop flow sensor for sensing a crop flow in the agricultural machine,
        and
        an arithmetic unit for estimating a current quantity of the resource on a basis of the variable measured by the at least one sensor,
        wherein the arithmetic unit furthermore calculates and indicates an operating capacity of the internal combustion engine that remains before the resource is depleted and, based on sensed crop flow and reference to a mean of past measured crop flows, converts a remaining run time to a remaining crop quantity that may be harvested by the agricultural machine before the resource consumed by the auxiliary unit is depleted.

15. The monitoring device according to claim 3, wherein the interface specifies, at least, times of use and non-use of the engine.

16. The monitoring device according to claim 3, wherein the interface forecasts the remaining operating capacity, during or after implementation of the work plan.

* * * * *